US012802674B2

(12) United States Patent
Gong et al.

(10) Patent No.: US 12,802,674 B2
(45) Date of Patent: Nov. 17, 2026

(54) ANTISTATIC SOUND-ABSORBING MATERIAL AND PREPARATION METHOD THEREFOR, AND LOUDSPEAKER AND ELECTRONIC DEVICE

(71) Applicant: SSI NEW MATERIAL (ZHENJIANG) CO., LTD., Zhenjiang City (CN)

(72) Inventors: Chang Gong, Zhenjiang City (CN); Lei Zhang, Zhenjiang City (CN); Mingbo Guo, Zhenjiang City (CN); Yuanhong Ma, Zhenjiang City (CN); Zhendan Zhang, Zhenjiang City (CN)

(73) Assignee: SSI NEW MATERIAL (ZHENJIANG) CO., LTD., Zhenjiang City (CN)

( * ) Notice: Subject to any disclaimer, the term of this patent is extended or adjusted under 35 U.S.C. 154(b) by 143 days.

(21) Appl. No.: 18/673,211

(22) Filed: May 23, 2024

(65) Prior Publication Data

US 2024/0339098 A1 Oct. 10, 2024

Related U.S. Application Data

(63) Continuation of application No. PCT/CN2022/109060, filed on Jul. 29, 2022.

(51) Int. Cl.
*G10K 11/162* (2006.01)
*H04R 1/02* (2006.01)

(52) U.S. Cl.
CPC ............. *G10K 11/162* (2013.01); *H04R 1/02* (2013.01)

(58) Field of Classification Search
CPC ...... G10K 11/162; G10K 11/165; H04R 1/02; H04R 9/02; C04B 2111/52
See application file for complete search history.

(56) References Cited

U.S. PATENT DOCUMENTS

| | | | |
|---|---|---|---|
| 2013/0170687 A1 | 7/2013 | Papakyriacou et al. | |
| 2017/0178615 A1 | 6/2017 | Lin et al. | |

(Continued)

FOREIGN PATENT DOCUMENTS

| | | | |
|---|---|---|---|
| CN | 108395758 * | 3/2018 | ............... C09D 5/24 |
| CN | 108395637 A | 8/2018 | |

(Continued)

OTHER PUBLICATIONS

PCT International Search Report for Application No. PCT/CN2022/109060, dated Oct. 12, 2022, 3 pages.

(Continued)

*Primary Examiner* — Yosef K Laekemariam
(74) *Attorney, Agent, or Firm* — Hoffman Warnick LLC

(57) ABSTRACT

An antistatic sound-absorbing material and a preparation method therefor, and a loudspeaker and an electronic device. The antistatic sound-absorbing material comprises molecular sieve particles, an adhesive and an antistatic additive, wherein taking the total weight of the molecular sieve particles as 100%, the weight of the antistatic additive is 0.5-10% of the total weight of the molecular sieve particles. By means of providing the antistatic sound-absorbing material provided in the present invention on a rear cavity of a loudspeaker of an electronic device, the problems of agglomeration and interface attachment caused by an accumulation of static electricity generated by friction and collision between materials can be solved, such that loss can be reduced, and the filling quantity is increased, thereby guaranteeing stability during long-term use.

20 Claims, 2 Drawing Sheets

(56) References Cited

U.S. PATENT DOCUMENTS

| | | | |
|---|---|---|---|
| 2018/0167721 A1 | 6/2018 | Feng | |
| 2019/0208312 A1 | 7/2019 | Cao et al. | |

FOREIGN PATENT DOCUMENTS

| | | | | |
|---|---|---|---|---|
| CN | 108727699 A | | 11/2018 | |
| CN | 109097866 A | | 12/2018 | |
| CN | 109437222 A | | 3/2019 | |
| CN | 110343270 A | | 10/2019 | |
| CN | 111135772 A | | 5/2020 | |
| CN | 112399289 | * | 2/2021 | ........... G10K 11/165 |
| CN | 112399289 A | | 2/2021 | |
| CN | 112876277 A | | 6/2021 | |
| CN | 113060975 A | | 7/2021 | |
| CN | 113060976 A | | 7/2021 | |
| CN | 213846935 U | | 7/2021 | |
| CN | 113528009 A | | 10/2021 | |
| EP | 4391587 A1 | | 6/2024 | |
| JP | 2018146744 A | | 9/2018 | |
| KR | 101806834 B1 | | 12/2017 | |
| KR | 20180038437 A | | 4/2018 | |
| KR | 101979883 B1 | | 5/2019 | |
| WO | 2021171967 A1 | | 9/2021 | |

OTHER PUBLICATIONS

Extended European Search Report issued on Nov. 4, 2025 for counterpart European patent application No. 22897202.2, 9 pages.

Michael J O 'connell: "Carbon Nanotubes: Properties and Applications" In: "Carbon Nanotubes: Properties and Applications", Jan. 1, 2006 (Jan. 1, 2006), CRC Taylor & Francis.

First Office Action issued for corresponding Japanese Patent Application 2024-531336 mailed on Jun. 10, 2025.

* cited by examiner

ANTISTATIC SOUND-ABSORBING MATERIAL AND PREPARATION METHOD THEREFOR, AND LOUDSPEAKER AND ELECTRONIC DEVICE

TECHNICAL FIELD

The present invention relates to an antistatic sound-absorbing material and a preparation method therefor, a loudspeaker and an electronic device and belongs to the technical field of electroacoustic materials, and further the technical field of improved sound-absorbing materials for audio loudspeakers.

BACKGROUND ART

With the increasingly smaller, lighter and thinner electronic products, the volume of loudspeaker components is getting smaller and smaller. In order to reduce the resonant frequency of a loudspeaker and improve the low-frequency performance of an electronic product, filling the rear cavity of a loudspeaker with sound-absorbing granules molded from a porous material has become a mainstream solution at present. The main principle is that the loudspeaker diaphragm, during the back and forth movement compresses and decompresses the air in the rear cavity, forming pressure fluctuations; and the sound-absorbing granules will adsorb and desorb the air to reduce the pressure fluctuations to a certain extent due to the characteristics of porous materials themselves, which is equivalent to virtually increasing the space of the rear cavity to reduce the influence of the pressure fluctuations.

Currently, the particle size of commercially available sound-absorbing granules is usually between 100 and 500 μm. The electrical equilibrium of powder granules is broken during friction and transportation, resulting in static electricity, which increases the interaction force between granules and causes the sound-absorbing granules to aggregate or attach to the surface of the device, thereby affecting the storage, transportation, filling and the like of the sound-absorbing granules.

Currently, when sound-absorbing granules are used, the static electricity generated during the transportation is mainly removed by exposing the sound-absorbing granules taken out of the packaging to plasma air blown by a plasma air blower. However, in the process of filling, it is impossible to expose the sound-absorbing granules to plasma air blown by a plasma air blower due to the small volume and light weight of sound-absorbing granules. Therefore, there is no effective way to remove the static electricity generated during transportation on the module filling line. However, the static electricity generated in this process greatly affects the use of sound-absorbing granules.

Moreover, during the molding process of a polymer material, the static electricity of the material is removed mainly by adding a certain amount of an antistatic agent. The hydrophilic group in the added antistatic agent can enhance the hygroscopicity of the material surface, and a conductive film is formed, thus enabling the material to have antistatic performance. However, the conventional antistatic agents currently used are mostly polymer materials, and the conductive film formed thereby will block the porous structure of the sound-absorbing granules to some extent, thereby impairing the acoustic improvement effect of the sound-absorbing granules.

Therefore, providing a new antistatic sound-absorbing material and a preparation method therefor, a loudspeaker and an electronic device has become a technical problem to be urgently solved in the art.

SUMMARY OF THE INVENTION

In order to overcome the aforementioned disadvantages and shortcomings, an object of the present invention is to provide an antistatic sound-absorbing material.

Another object of the present invention is to provide a method for preparing an antistatic sound-absorbing material.

A yet further object of the present invention is to provide a loudspeaker, the rear cavity of which is filled with the aforementioned antistatic sound-absorbing material.

A yet still another object of the present invention is to provide an electronic device, comprising a loudspeaker filled with the aforementioned antistatic sound-absorbing material in the rear cavity thereof. By filling the rear cavity of the loudspeaker of the electronic device with the antistatic sound-absorbing material provided by the present invention, issues related to material agglomeration and attachment-to-interface during transportation, filling and use caused by the accumulation of static electricity of material, such as a granular antistatic sound-absorbing material, can be solved, thereby reducing losses in these processes, increasing the filling amount, and guaranteeing stability during long-term use.

In order to achieve the objects above, in an aspect, the present invention provides an antistatic sound-absorbing material, comprising molecular sieve particles, an adhesive and an antistatic additive; wherein the antistatic additive is 0.5-10%, based on 100% of the total weight of the molecular sieve particles.

As a specific embodiment of the aforementioned antistatic sound-absorbing material of the present invention, the antistatic additive comprises one or more of graphene, carbon nanotubes and graphite.

In the present invention, the less the number of layers of the graphene, the better. In some preferred embodiments of the present invention, the number of layers of the graphene is 10 or less.

As a specific embodiment of the aforementioned antistatic sound-absorbing material of the present invention, the carbon nanotubes have an average aperture of 5-20 nm, and an average length of 1-20 μm in D50, preferably 5-15 μm.

As a specific embodiment of the aforementioned antistatic sound-absorbing material of the present invention, the content of the adhesive, in terms of the solid component of the adhesive, is 4-15%, based on 100% of the total weight of the molecular sieve particles.

As a specific embodiment of the aforementioned antistatic sound-absorbing material of the present invention, the adhesive comprises an organic adhesive and/or an inorganic adhesive.

As a specific embodiment of the aforementioned antistatic sound-absorbing material of the present invention, the organic adhesive comprises one or more of a polyacrylate suspension, a polystyrene acrylate suspension, a polyvinyl acetate suspension, and a polystyrene butadiene suspension.

As a specific embodiment of the aforementioned antistatic sound-absorbing material of the present invention, the organic adhesive is 5-12%.

As a specific embodiment of the aforementioned antistatic sound-absorbing material of the present invention, the inorganic adhesive comprises one or more of kaolin, a silica sol, an alumina sol, and carboxymethyl cellulose.

As a specific embodiment of the aforementioned antistatic sound-absorbing material of the present invention, the inorganic adhesive is 5-10%.

As a specific embodiment of the aforementioned antistatic sound-absorbing material of the present invention, the molecular sieve particles comprise one or more of MFI, MEL, FER, CHA, IHW, IWV, ITE, UTL, VET, and MTW molecular sieves.

As a specific embodiment of the aforementioned antistatic sound-absorbing material of the present invention, the molecular sieve particles have a specific surface area greater than 300 $m^2/g$, a pore volume of 0.16-0.32 $cm^3/g$, a molar ratio of silicon oxide to aluminum oxide greater than 200, and an average particle size of 0.1-30 μm, preferably 0.5-10 μm.

As a specific embodiment of the aforementioned antistatic sound-absorbing material of the present invention, the molecular sieve particles are ZSM-5 molecular sieve particles.

As a specific embodiment of the aforementioned antistatic sound-absorbing material of the present invention, the shape of the antistatic sound-absorbing material includes a granular, blocky or flaky shape.

As a specific embodiment of the aforementioned antistatic sound-absorbing material of the present invention, the antistatic sound-absorbing material in a granular shape has a three-level pore structure, with the size of a first-level pore structure being 0.3-0.7 nm, the size of a second-level pore structure being 2-30 nm, and the size of a third-level pore structure being 1-10 μm.

As a specific embodiment of the aforementioned antistatic sound-absorbing material of the present invention, the antistatic sound-absorbing material in a granular shape has a bulk density of 0.32-0.64 g/mL.

As a specific embodiment of the aforementioned antistatic sound-absorbing material of the present invention, the antistatic sound-absorbing material in a granular shape has a particle size of 50-1,000 μm, preferably 100-700 μm.

When the antistatic sound-absorbing material is of a granular shape, the smaller the particle size and bulk density thereof, the more significant effect of the agglomeration and attachment reduced by the antistatic additive of the antistatic sound-absorbing material. Moreover, when the antistatic sound-absorbing material is of a blocky or flaky shape, smaller agglomeration and attachment occur. Compared with a granular antistatic sound-absorbing material, a flaky or blocky antistatic sound-absorbing material has a larger volume and is not significantly affected by static electricity. The antistatic agent added to the material is mainly used to reduce the adsorption of the tiny substances in the air on the surface of the flaky or blocky antistatic sound-absorbing material.

In another aspect, the present invention further provides a method for preparing an antistatic sound-absorbing material, the method comprising mixing raw materials with a solvent, followed by molding to prepare the antistatic sound-absorbing material, wherein the raw materials comprise molecular sieve particles, an adhesive, and an antistatic additive; the amount of the antistatic additive is 0.5-3%, based on 100% of the total weight of the molecular sieve particles.

As a specific embodiment of the aforementioned method for preparing an antistatic sound-absorbing material of the present invention, the antistatic additive comprises one or more of graphene, carbon nanotubes and graphite.

As a specific embodiment of the aforementioned method for preparing an antistatic sound-absorbing material of the present invention, the antistatic additive is in the form of a powder or a slurry.

As a specific embodiment of the aforementioned method for preparing an antistatic sound-absorbing material of the present invention, when the antistatic additive is in the form of a powder, the amount thereof is 0.5-10%; and when the antistatic additive is in the form of a slurry, the amount thereof is 1-10%, where the amount of the antistatic additive in the form of a slurry is in terms of the amount of the solid component of the slurry.

As a specific embodiment of the aforementioned method for preparing an antistatic sound-absorbing material of the present invention, when the antistatic additive is in the form of a slurry, the solid content thereof is 3-10%, preferably 4-7%.

As a specific embodiment of the aforementioned method for preparing an antistatic sound-absorbing material of the present invention, when the antistatic additive is in the form of a slurry, the raw materials further comprise a dispersant, and the amount of the dispersant is 0.5-2%, based on 100% of the total weight of the molecular sieve particles.

As a specific embodiment of the aforementioned method for preparing an antistatic sound-absorbing material of the present invention, the dispersant comprises one or more of an aqueous polyethylene glycol ester solution, an aqueous ammonium polycarboxylate solution, an aqueous sodium polycarboxylate solution, an aqueous polyacrylate solution, and a polyacrylate copolymer. The polyethylene glycol ester comprises, but is not limited to, polyethylene glycol fatty acid ester, polyethylene glycol oleate, etc.

As a specific embodiment of the aforementioned method for preparing an antistatic sound-absorbing material of the present invention, the antistatic additive is a carbon nanotube powder or an aqueous carbon nanotube slurry.

As a specific embodiment of the aforementioned method for preparing an antistatic sound-absorbing material of the present invention, the aqueous carbon nanotube slurry has a pH value of 6-10, and a viscosity of 1,000-5,000 mPa·s, preferably 1,000-3,000 mPa·s.

As a specific embodiment of the aforementioned method for preparing an antistatic sound-absorbing material of the present invention, the raw materials further comprise an auxiliary agent, and the amount of the auxiliary agent is 0.5-1.5%, based on 100% of the total weight of the molecular sieve particles.

The use of the auxiliary agent can improve the binding force between the molecular sieve particles and the adhesive, thereby reducing powder falling.

As a specific embodiment of the aforementioned method for preparing an antistatic sound-absorbing material of the present invention, the auxiliary agent comprises one or more of ethylene glycol, propylene glycol, glycerol and dimethyl sulfoxide.

As a specific embodiment of the aforementioned method for preparing an antistatic sound-absorbing material of the present invention, the adhesive comprises an organic adhesive and/or an inorganic adhesive, wherein the solid content of the organic adhesive is 30-60%, and the solid contents of the inorganic adhesives of silica sol and alumina sol are 30-50% respectively.

As a specific embodiment of the aforementioned method for preparing an antistatic sound-absorbing material of the present invention, the solvent comprises but is not limited to water, and the amount of the solvent can be selected according to actual needs.

As a specific embodiment of the aforementioned method for preparing an antistatic sound-absorbing material of the present invention, the molding comprises spray granulation, sintering molding, drying in a flat mold and demolding, etc., and the three molding methods correspond to granular, blocky and flaky antistatic sound-absorbing materials respectively.

As a specific embodiment of the aforementioned method for preparing an antistatic sound-absorbing material of the present invention, with a granular antistatic sound-absorbing material as an example, the method comprises the following specific steps when the antistatic additive is a carbon nanotube powder:

first mixing molecular sieve particles, water and a carbon nanotube powder in a mass ratio of 1:0.8-1.5:0.005-0.02, then feeding the resulting mixture to a sand mill for wet-grinding for 10-90 min, and then adding an adhesive and an auxiliary agent to the uniformly mixed slurry, followed by spray granulation to obtain the granular antistatic sound-absorbing material.

As a specific embodiment of the aforementioned method for preparing an antistatic sound-absorbing material of the present invention, with a granular antistatic sound-absorbing material as an example, the method comprises the following steps when the antistatic additive is a carbon nanotube slurry:

first mixing molecular sieve particles, water, a carbon nanotube slurry and a dispersant in a mass ratio of 1:0.55-1.25:0.005-0.03:0.005-0.02, then placing the resulting mixture in an ultrasonic dispersion device for ultrasonic dispersion for 40-120 min, and then adding an adhesive and an auxiliary agent to the mixed solution, followed by spray granulation to obtain the granular antistatic sound-absorbing material.

When a carbon nanotube powder is used as an antistatic additive, the carbon nanotube powder and the molecular sieve particles are uniformly dispersed by means of grinding using a sand mill. The method has the advantages that the molecular sieve particles and carbon nanotubes are ground in the same slurry, and the powder is uniformly mixed, such that the carbon nanotubes can better attach to the surfaces of the molecular sieve particles to form a stable system, the prepared suspension is less prone to agglomerate and precipitate, and the loss of the carbon nanotubes in the stable system during subsequent filtration and standing is more significantly reduced compared to directly using a carbon nanotube slurry. However, preparing an antistatic sound-absorbing material in such a way will, to some extent, affect the acoustic performance improvement effect of the antistatic sound-absorbing material thus produced. Compared to using a carbon nanotube powder as an antistatic additive, when a carbon nanotube slurry is used as an antistatic additive to prepare an antistatic sound-absorbing material, the carbon nanotube slurry is dispersed in a suspension of molecular sieve particles, which dispersion system has a relatively high viscosity, such that the binding of carbon nanotubes with molecular sieve particles is relatively poor, and agglomeration and settlement occur easily.

In yet another aspect, the present invention further provides a loudspeaker comprising one or more acoustic sensors, and one or more housings, which are combined to form a rear cavity of the loudspeaker, wherein the rear cavity of the loudspeaker is filled with the aforementioned antistatic sound-absorbing material.

In yet still another aspect, the present invention further provides an electronic device, comprising a loudspeaker filled with the aforementioned antistatic sound-absorbing material in the rear cavity thereof.

As a specific embodiment of the aforementioned electronic device of the present invention, the electronic device includes a smartphone, a TWS headphone, a headset, smart glasses, a smart watch, a VR device, an AR device, a tablet computer, or a thin-and-light notebook computer.

The beneficial technical effects achieved by the present invention include:

(1) In the present invention, a carbon material (graphene, carbon nanotubes, graphite, etc.) is used as an antistatic additive of the antistatic sound-absorbing material. The carbon material itself has a large specific surface area and a certain porosity, thus having less influence on acoustic effect when used as an antistatic additive in a sound-absorbing material. Moreover, the coordination of the unique pore structure of the carbon material itself and the porous structure of the molecular sieve particles can further improve the effect of air absorption and desorption.

(2) When used in the rear cavity of a loudspeaker, the antistatic sound-absorbing material provided by the present invention can adjust the air pressure change in the rear cavity by absorbing and desorbing the air, thus improving the low-frequency response of the loudspeaker and the acoustic performance of the loudspeaker. Compared with a common sound-absorbing material, the antistatic sound-absorbing materials provided by the present invention have a weaker interaction force (attractive force) therebetween, the release of the electricity generated by friction is quick, the accumulated static electricity is weak, and the static electricity generated by friction between the antistatic sound-absorbing material and other components of the loudspeaker is reduced. The granular antistatic sound-absorbing materials are less prone to agglomerate and attach to the filling and box modules. That is, the aggregation and attachment to the modules of granules are effectively reduced, thus improving the filling amount and filling efficiency to some extent. In addition, the less the granules agglomerate, the better the improvement effect on the interior acoustic performance. The blocky or flaky antistatic sound-absorbing material realizes less surface adsorption of tiny substances in the air, thus reducing the probability of pore blockage on the surface.

(3) The antistatic sound-absorbing material provided by the present invention can be used in the rear cavity of a loudspeaker of a product required to be small, light and thin, such as a smartphone, a VR device, an AR device, a TWS headphone, etc., to provide the product with better acoustic performance.

BRIEF DESCRIPTION OF THE DRAWINGS

To illustrate the technical solutions of the examples of the present invention or in the prior art more clearly, the accompanying drawings for describing the examples are briefly described below. Apparently, the accompanying drawings in the following description illustrate some examples of the present invention, and a person of ordinary skill in the art may derive other drawings from these accompanying drawings without creative efforts.

DETAILED DESCRIPTION OF EMBODIMENTS

The "range" disclosed herein is given in the form of a lower limit and an upper limit. There may be one or more lower limits and one or more upper limits, respectively. A given range is limited by selecting a lower limit and an upper limit. The selected lower limit and upper limit define the boundaries of a specific range. All ranges defined in this way can be combined, that is, any lower limit can be combined with any upper limit to form a range. For example, where ranges of 60-120 and 80-110 are listed for a specific parameter, it should be understood that the ranges of 60-110 and 80-120 can also be predicted. Furthermore, if the minimum values listed for a range are 1 and 2, and the maximum values listed for a range are 3, 4 and 5, all of the following ranges can be predicted: 1-3, 1-4, 1-5, 2-3, 2-4 and 2-5.

In the present invention, unless otherwise stated, the numerical range "a-b" represents an abbreviation of any combination of real numbers between a and b, where a and b are both real numbers. For example, the numerical range "0-5" means that all of the real numbers between "0-5" have been listed herein, and the "0-5" is just an abbreviation of these numerical combinations.

In the present invention, unless otherwise specified, all of the embodiments and preferred embodiments mentioned herein can be combined with each other to form new technical solutions.

In the present invention, unless otherwise specified, all of the technical features and preferred features mentioned herein can be combined with each other to form new technical solutions.

In the present invention, unless otherwise specified, the "comprise" mentioned herein may be open-ended or closed-ended. For example, the "comprise" may mean that other unlisted materials and/or elements can also be included, or only the listed materials and/or elements can be included.

In order to understand the technical features, object and beneficial effects of the present invention more clearly, the technical solutions of the present invention are described in detail in view of specific examples as below, which cannot be construed as a limitation for the implementable scope of the present invention.

Example 1

Figure 1:
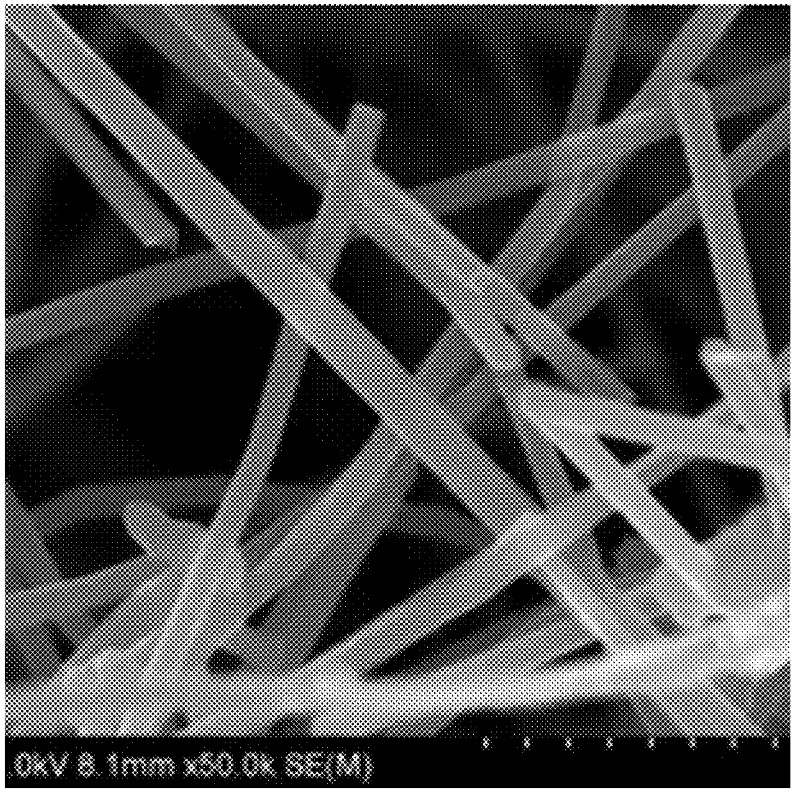
FIG. 1 is an image (SEM image) of the morphology of a carbon nanotube powder used in an example of the present invention.

In this example, a granular antistatic sound-absorbing material was provided, which was prepared following specific steps:

mixing 100 g of ZSM-5 molecular sieve particles, 90 g of water, and 0.5 g of a carbon nanotube powder until uniform, and feeding the resulting mixture to a sand mill, grinding same for 30 min, and then removing same out to obtain a solution A, wherein the ZSM-5 molecular sieve particles used had a molar ratio of silicon oxide to aluminum oxide of 425, a pore volume of 0.247 mL/g, an average particle size of 1.73 μm, and a specific surface area of 385 $m^2/g$;

the carbon nanotubes used had an average aperture of 5-20 nm, and an average particle size, i.e., an average length calculated as D50, ≤10 μm; and the image of the morphology of the carbon nanotubes was as shown in FIG. 1;

mixing 30 g of water, 15 g of a polystyrene acrylate suspension with a solid content of 40%, and 1 g of propylene glycol until uniform to obtain a solution B; and adding the solution B to the solution A to obtain a mixed solution C, and filtering the mixed solution C with a 400-mesh filter paper, followed by granulation to obtain the granular antistatic sound-absorbing material.

The granular antistatic sound-absorbing material prepared in this example had an average particle size of 364 μm, and a bulk density of 0.357 g/mL; and the granular material comprised 0.5% of the carbon nanotubes and 5.98% of polystyrene acrylate, based on 100% of the total weight of the molecular sieve particles.

Example 2

In this example, a granular antistatic sound-absorbing material was provided, which was prepared following specific steps:

mixing 100 g of ZSM-5 molecular sieve particles, 90 g of water, and 1 g of a carbon nanotube powder until uniform, and then feeding the resulting mixture to a sand mill, grinding same for 40 min, and removing same out to obtain a solution A, wherein the ZSM-5 molecular sieve particles used had a molar ratio of silicon oxide to aluminum oxide of 425, a pore volume of 0.247 mL/g, an average particle size of 1.73 μm, and a specific surface area of 385 $m^2/g$; and the carbon nanotubes used had an average aperture of 5-20 nm, and an average particle size, i.e., an average length calculated as D50, ≤10 μm;

mixing 30 g of water, 15 g of a polystyrene acrylate suspension with a solid content of 40%, and 1 g of propylene glycol until uniform to obtain a solution B; and adding the solution B to the solution A to obtain a mixed solution C, and filtering the mixed solution C with a 400-mesh filter paper, followed by granulation to obtain the granular antistatic sound-absorbing material.

The granular antistatic sound-absorbing material prepared in this example had an average particle size of 366 μm, and a bulk density of 0.354 g/mL; and the granular material comprised 0.99% of the carbon nanotubes and 5.99% of polystyrene acrylate, based on 100% of the total weight of the molecular sieve particles.

Example 3

In this example, a granular antistatic sound-absorbing material was provided, which was prepared following specific steps:

mixing 100 g of ZSM-5 molecular sieve particles, 90 g of water, and 2 g of a carbon nanotube powder until uniform, and feeding the resulting mixture to a sand mill, grinding same for 45 min, and then removing same out to obtain a solution A, wherein the ZSM-5 molecular sieve particles used had a molar ratio of silicon oxide to aluminum oxide of 425, a pore volume of 0.247 mL/g, an average particle size of 1.73 μm, and a specific surface area of 385 $m^2/g$; and the carbon nanotubes used had an average aperture of 5-20 nm, and an average particle size, i.e., an average length calculated as D50, ≤10 μm;

mixing 30 g of water, 15 g of a polystyrene acrylate suspension with a solid content of 40%, and 1 g of propylene glycol until uniform to obtain a solution B; and adding the solution B to the solution A to obtain a mixed solution C, and filtering the mixed solution C with a 400-mesh filter paper, followed by granulation to obtain the granular antistatic sound-absorbing material.

The granular antistatic sound-absorbing material prepared in this example had an average particle size of 362 am and a bulk density of 0.36 g/mL; and the granular material comprised 2% of the carbon nanotubes and 6% of polystyrene acrylate, based on 100% of the total weight of the molecular sieve particles.

Example 4

In this comparative example, a granular antistatic sound-absorbing material was provided, which was prepared following specific steps:

- mixing 100 g of ZSM-5 molecular sieve particles, 90 g of water, and 3.5 g of a carbon nanotube powder until uniform, and feeding the resulting mixture to a sand mill, grinding same for 50 min, and then removing same out to obtain a solution A, wherein
- the ZSM-5 molecular sieve particles used had a molar ratio of silicon oxide to aluminum oxide of 425, a pore volume of 0.247 mL/g, an average particle size of 1.73 μm, and a specific surface area of 385 $m^2/g$; and
- the carbon nanotubes used had an average aperture of 5-20 nm, and an average particle size, i.e., an average length calculated as D50, ≤10 μm;
- mixing 30 g of water, 15 g of a polystyrene acrylate suspension with a solid content of 40%, and 1 g of propylene glycol until uniform to obtain a solution B; and
- adding the solution B to the solution A to obtain a mixed solution C, and filtering the mixed solution C with a 400-mesh filter paper, followed by granulation to obtain the granular antistatic sound-absorbing material.

The granular antistatic sound-absorbing material prepared in this comparative example had an average particle size of 366 μm, and a bulk density of 0.357 g/mL; and the granular material comprised 3.48% of the carbon nanotubes and 5.89% of polystyrene acrylate, based on 100% of the total weight of the molecular sieve particles.

Example 5

In this example, a blocky sound-absorbing material was provided, which was prepared following specific steps:

- mixing 100 g of ZSM-5 molecular sieve particles, 90 g of water, and 0.5 g of a carbon nanotube powder until uniform, and feeding the resulting mixture to a sand mill, grinding same for 30 min, and then removing same out to obtain a solution A, wherein
- the ZSM-5 molecular sieve particles used had a molar ratio of silicon oxide to aluminum oxide of 425, a pore volume of 0.247 mL/g, an average particle size of 1.73 μm, and a specific surface area of 385 $m^2/g$; and
- the carbon nanotubes used had an average aperture of 5-20 nm, and an average particle size, i.e., an average length calculated as D50, ≤10 μm;
- mixing 30 g of water, 14 g of a silica sol with a solid content of 30%, and 1 g of propylene glycol until uniform to obtain a solution B; and
- adding the solution B to the solution A to obtain a mixed solution C, filtering the mixed solution C with a 400-mesh filter paper, then pouring same into a block mold (a conventional apparatus used in the art), and molding same by sintering at 450° C. for 4 h, followed by demolding to obtain the blocky antistatic sound-absorbing material.

The blocky antistatic sound-absorbing material prepared in this example had a bulk density of 0.389 g/mL; and the blocky material comprised 0.5% of the carbon nanotubes, based on 100% of the total weight of the molecular sieve particles.

Example 6

In this example, a flaky antistatic sound-absorbing material was provided, which was prepared following specific steps:

- mixing 100 g of ZSM-5 molecular sieve particles, 90 g of water, and 1 g of a carbon nanotube powder until uniform, and feeding the resulting mixture to a sand mill, grinding same for 40 min, and then removing same out to obtain a solution A, wherein
- the ZSM-5 molecular sieve particles used had a molar ratio of silicon oxide to aluminum oxide of 425, a pore volume of 0.247 mL/g, an average particle size of 1.73 μm, and a specific surface area of 385 $m^2/g$; and
- the carbon nanotubes used had an average aperture of 5-20 nm, and an average particle size, i.e., an average length calculated as D50, ≤10 μm;
- mixing 30 g of water, 15 g of a polystyrene acrylate suspension with a solid content of 40%, and 1 g of propylene glycol until uniform to obtain a solution B; and
- adding the solution B to the solution A to obtain a mixed solution C, filtering the mixed solution C with a 400-mesh filter paper, then spreading same into a large flat mold (a conventional apparatus used in the art) and drying same at 110° C. for 30 min, followed by demolding to obtain the flaky antistatic sound-absorbing material.

The flaky antistatic sound-absorbing material prepared in this example had an average thickness of 542 μm, and a bulk density of 0.532 g/mL; and the flaky material comprised 1% of the carbon nanotubes and 6% of polystyrene acrylate, based on 100% of the total weight of the molecular sieve particles.

Example 7

In this example, a granular antistatic sound-absorbing material was provided, which was prepared following specific steps:

- mixing 100 g of ZSM-5 molecular sieve particles, 80 g of water, 20 g of an aqueous carbon nanotube slurry (with a solid content of 5%), and 1 g of an aqueous polyethylene glycol fatty acid ester solution until uniform, followed by ultrasonication for 45 min to obtain a solution A, wherein
- the ZSM-5 molecular sieve particles used had a molar ratio of silicon oxide to aluminum oxide of 425, a pore volume of 0.247 mL/g, an average particle size of 1.73 μm, and a specific surface area of 385 $m^2/g$;
- the carbon nanotubes used had an average aperture of 5-20 nm, and an average particle size, i.e., an average length calculated as D50, ≤10 μm; and
- the aqueous carbon nanotube slurry used had a pH value of 7.2, and a viscosity of 1,856 mPa·s;
- mixing 20 g of water, 15 g of a polystyrene acrylate suspension with a solid content of 40%, and 1 g of propylene glycol until uniform to obtain a solution B; and adding the solution B to the solution A to obtain a mixed solution C, and filtering the mixed solution C with a 400-mesh filter paper, followed by granulation to obtain the granular antistatic sound-absorbing material.

The granular antistatic sound-absorbing material prepared in this example had an average particle size of 373 am and a bulk density of 0.355 g/mL; and the granular material comprised 0.98% of the carbon nanotubes and 6% of polystyrene acrylate, based on 100% of the total weight of the molecular sieve particles.

Example 8

In this example, a granular antistatic sound-absorbing material was provided, which was prepared following specific steps:

mixing 100 g of ZSM-5 molecular sieve particles, 70 g of water, 40 g of an aqueous carbon nanotube slurry (with a solid content of 5%), and 1 g of an aqueous polyethylene glycol fatty acid ester solution until uniform, followed by ultrasonication for 60 min to obtain a solution A, wherein the ZSM-5 molecular sieve particles used had a molar ratio of silicon oxide to aluminum oxide of 425, a pore volume of 0.247 mL/g, an average particle size of 1.73 μm, and a specific surface area of 385 $m^2/g$;

the carbon nanotubes used had an average aperture of 5-20 nm, and an average particle size, i.e., an average length calculated as D50, ≤10 μm; and the aqueous carbon nanotube slurry used had a pH value of 7.2, and a viscosity of 1,856 mPa·s; mixing 20 g of water, 15 g of a polystyrene acrylate suspension with a solid content of 40%, and 1 g of propylene glycol until uniform to obtain a solution B; and adding the solution B to the solution A to obtain a mixed solution C, and filtering the mixed solution C with a 400-mesh filter paper, followed by granulation to obtain the granular antistatic sound-absorbing material.

The granular antistatic sound-absorbing material prepared in this example had an average particle size of 377 am and a bulk density of 0.361 g/mL; and the granular material comprised 1.98% of the carbon nanotubes and 5.96% of polystyrene acrylate, based on 100% of the total weight of the molecular sieve particles.

Example 9

In this example, a granular antistatic sound-absorbing material was provided, which was prepared following specific steps:

mixing 100 g of ZSM-5 molecular sieve particles, 55 g of water, 60 g of an aqueous carbon nanotube slurry (with a solid content of 5%), and 1 g of an aqueous polyethylene glycol fatty acid ester solution until uniform, followed by ultrasonication for 70 min to obtain a solution A, wherein the ZSM-5 molecular sieve particles used had a molar ratio of silicon oxide to aluminum oxide of 425, a pore volume of 0.247 mL/g, an average particle size of 1.73 μm, and a specific surface area of 385 $m^2/g$;

the carbon nanotubes used had an average aperture of 5-20 nm, and an average particle size, i.e., an average length calculated as D50, ≤10 μm; and the aqueous carbon nanotube slurry used had a pH value of 7.2, and a viscosity of 1,856 mPa·s;

mixing 20 g of water, 15 g of a polystyrene acrylate suspension with a solid content of 40%, and 1 g of propylene glycol until uniform to obtain a solution B; and adding the solution B to the solution A to obtain a mixed solution C, and filtering the mixed solution C with a 400-mesh filter paper, followed by granulation to obtain the granular antistatic sound-absorbing material.

The granular antistatic sound-absorbing material prepared in this example had an average particle size of 381 μm and a bulk density of 0.365 g/mL; and the granular material comprised 0.98% of the carbon nanotubes and 6% of polystyrene acrylate, based on 100% of the total weight of the molecular sieve particles.

Example 10

In this example, a granular antistatic sound-absorbing material was provided, which was prepared following specific steps:

mixing 100 g of S-1 molecular sieve particles (with MFI structure), 90 g of water, and 0.5 g of a carbon nanotube powder until uniform, and feeding the resulting mixture to a sand mill, grinding same for 30 min, and then removing same out to obtain a solution A, wherein the carbon nanotubes used had an average aperture of 5-20 nm, and an average particle size, i.e., an average length calculated as D50, ≤10 μm;

mixing 30 g of water, 15 g of a polystyrene acrylate suspension with a solid content of 40%, and 1 g of propylene glycol until uniform to obtain a solution B; and adding the solution B to the solution A to obtain a mixed solution C, and filtering the mixed solution C with a 400-mesh filter paper, followed by granulation to obtain the granular antistatic sound-absorbing material.

The granular antistatic sound-absorbing material prepared in this example had an average particle size of 363 μm and a bulk density of 0.361 g/mL; and the granular material comprised 0.5% of the carbon nanotubes and 5.91% of polystyrene acrylate, based on 100% of the total weight of the molecular sieve particles.

Example 11

In this example, a granular antistatic sound-absorbing material was provided, which was prepared following the same preparation steps as in example 9, except that 100 g of ZSM-35 molecular sieve particles (with FER structure) were used. The granular antistatic sound-absorbing material prepared in this example had an average particle size of 370 μm and a bulk density of 0.365 g/mL; and the granular material comprised 0.5% of the carbon nanotubes and 6% of polystyrene acrylate, based on 100% of the total weight of the molecular sieve particles.

Example 12

In this example, a granular antistatic sound-absorbing material was provided, which was prepared following specific steps:

mixing 100 g of ZSM-5 molecular sieve particles, 90 g of water, and 0.5 g of a graphene powder until uniform, and feeding the resulting mixture to a sand mill, grinding same for 30 min, and then removing same out to obtain a solution A, wherein the ZSM-5 molecular sieve particles used had a molar ratio of silicon oxide to aluminum oxide of 425, a pore volume of 0.247 mL/g, an average particle size of 1.73 μm, and a specific surface area of 385 $m^2/g$; and the average number of layers of graphene powder used was 10;

mixing 30 g of water, 15 g of a polystyrene acrylate suspension with a solid content of 40%, and 1 g of propylene glycol until uniform to obtain a solution B; and adding the solution B to the solution A to obtain a mixed solution C, and filtering the mixed solution C with a 400-mesh filter paper, followed by granulation to obtain the granular antistatic sound-absorbing material.

The granular antistatic sound-absorbing material prepared in this example had an average particle size of 363 am and a bulk density of 0.361 g/mL; and the granular material comprised 0.5% of the graphene and 6% of polystyrene acrylate, based on 100% of the total weight of the molecular sieve particles.

Comparative Example 1 (without Antistatic Additive of Carbon Nanotube/Graphene Powder)

In this comparative example, a granular sound-absorbing material was provided, which was prepared following specific steps:

mixing 100 g of ZSM-5 molecular sieve particles and 90 g of water until uniform to obtain a solution A, wherein the ZSM-5 molecular sieve particles used had a molar ratio of silicon oxide to aluminum oxide of 425, a pore volume of 0.247 mL/g, an average particle size of 1.73 μm, and a specific surface area of 385 $m^2/g$;

mixing 30 g of water, 15 g of a polystyrene acrylate suspension with a solid content of 40%, and 1 g of propylene glycol until uniform to obtain a solution B; and adding the solution B to the solution A to obtain a mixed solution C, and filtering the mixed solution C with a 400-mesh filter paper, followed by granulation to obtain the granular sound-absorbing material.

The granular sound-absorbing material prepared in this comparative example had an average particle size of 365 μm, and a bulk density of 0.358 g/mL.

Comparative Example 2 (with Antistatic Additive of Carbon Nanotube Powder in Amount not within the Scope Defined in Claims)

In this comparative example, a granular antistatic sound-absorbing material was provided, which was prepared following specific steps:

mixing 100 g of ZSM-5 molecular sieve particles, 90 g of water, and 11 g of a carbon nanotube powder until uniform, and feeding the resulting mixture to a sand mill, grinding same for 50 min, and then removing same out to obtain a solution A, wherein the ZSM-5 molecular sieve particles used had a molar ratio of silicon oxide to aluminum oxide of 425, a pore volume of 0.247 mL/g, an average particle size of 1.73 μm, and a specific surface area of 385 $m^2/g$; and the carbon nanotubes used had an average aperture of 5-20 nm, and an average particle size, i.e., an average length calculated as D50, ≤10 μm;

mixing 30 g of water, 15 g of a polystyrene acrylate suspension with a solid content of 40%, and 1 g of propylene glycol until uniform to obtain a solution B; and adding the solution B to the solution A to obtain a mixed solution C, and filtering the mixed solution C with a 400-mesh filter paper, followed by granulation to obtain the granular antistatic sound-absorbing material.

The granular antistatic sound-absorbing material prepared in this comparative example had an average particle size of 366 μm, and a bulk density of 0.357 g/mL; and the granular material comprised 10.3% of the carbon nanotubes and 5.89% of polystyrene acrylate, based on 100% of the total weight of the molecular sieve particles.

Comparative Example 3 (with Antistatic Additive of Carbon Nanotube Powder Having an Average Length not within the Scope Defined in Claims)

In this comparative example, a granular antistatic sound-absorbing material was provided, which was prepared following specific steps:

mixing 100 g of ZSM-5 molecular sieve particles, 90 g of water, and 1 g of a carbon nanotube powder until uniform, and feeding the resulting mixture to a sand mill, grinding same for 40 min, and then removing same out to obtain a solution A, wherein the ZSM-5 molecular sieve particles used had a molar ratio of silicon oxide to aluminum oxide of 425, a pore volume of 0.247 mL/g, an average particle size of 1.73 μm, and a specific surface area of 385 $m^2/g$; and the carbon nanotubes used had an average aperture of 5-20 nm, and an average particle size, i.e., an average length calculated as D50, 25 μm;

mixing 30 g of water, 15 g of a polystyrene acrylate suspension with a solid content of 40%, and 1 g of propylene glycol until uniform to obtain a solution B; and adding the solution B to the solution A to obtain a mixed solution C, and filtering the mixed solution C with a 400-mesh filter paper, followed by granulation to obtain the granular antistatic sound-absorbing material.

The granular antistatic sound-absorbing material prepared in this comparative example had an average particle size of 375 μm, and a bulk density of 0.351 g/mL.

Comparative Example 4 (with Antistatic Additive of Carbon Nanotube Powder Having an Average Length not within the Scope Defined in Claims)

In this comparative example, a granular antistatic sound-absorbing material was provided, which was prepared following specific steps:

mixing 100 g of ZSM-5 molecular sieve particles, 90 g of water, and 1 g of a carbon nanotube powder until uniform, and feeding the resulting mixture to a sand mill, grinding same for 45 min, and then removing same out to obtain a solution A, wherein the ZSM-5 molecular sieve particles used had a molar ratio of silicon oxide to aluminum oxide of 425, a pore volume of 0.247 mL/g, an average particle size of 1.73 μm, and a specific surface area of 385 $m^2/g$; and the carbon nanotubes used had an average aperture of 5-20 nm, and an average particle size, i.e., an average length calculated as D50, 40 μm;

mixing 30 g of water, 15 g of a polystyrene acrylate suspension with a solid content of 40%, and 1 g of propylene glycol until uniform to obtain a solution B; and adding the solution B to the solution A to obtain a mixed solution C, and filtering the mixed solution C with a 400-mesh filter paper, followed by granulation to obtain the granular antistatic sound-absorbing material.

The granular antistatic sound-absorbing material prepared in this comparative example had an average particle size of 379 μm, and a bulk density of 0.349 g/mL.

Comparative Example 5 (with Antistatic Additive of Aqueous Carbon Nanotube Slurry in Amount not within the Scope Defined in Claims)

In this comparative example, a granular antistatic sound-absorbing material was provided, which was prepared following specific steps:

- mixing 100 g of ZSM-5 molecular sieve particles, 50 g of water, 80 g of an aqueous carbon nanotube slurry (with a solid content of 5%), and 1 g of an aqueous polyethylene glycol fatty acid ester solution until uniform, followed by ultrasonication for 120 min to obtain a solution A, wherein
- the ZSM-5 molecular sieve particles used had a molar ratio of silicon oxide to aluminum oxide of 425, a pore volume of 0.247 mL/g, an average particle size of 1.73 μm, and a specific surface area of 385 $m^2/g$;
- the carbon nanotubes used had an average aperture of 5-20 nm, and an average particle size, i.e., an average length calculated as D50, ≤10 μm; and
- the aqueous carbon nanotube slurry used had a pH value of 7.2, and a viscosity of 1,856 mPa·s; mixing 20 g of water, 15 g of a polystyrene acrylate suspension with a solid content of 40%, and 1 g of propylene glycol until uniform to obtain a solution B; and
- adding the solution B to the solution A to obtain a mixed solution C, and filtering the mixed solution C with a 400-mesh filter paper, followed by granulation to obtain the granular antistatic sound-absorbing material.

The granular antistatic sound-absorbing material prepared in this comparative example had an average particle size of 382 μm, and a bulk density of 0.364 g/mL; and the granular material comprised 4% of the carbon nanotubes and 5.91% of polystyrene acrylate, based on 100% of the total weight of the molecular sieve particles.

Comparative Example 6 (with Different Type of Molecular Sieve without Antistatic Additive of Carbon Nanotube Powder)

In this comparative example, a granular sound-absorbing material was provided, which was prepared following specific steps:

- mixing 100 g of S-1 molecular sieve particles and 90 g of water until uniform to obtain a solution A;
- mixing 30 g of water, 15 g of a polystyrene acrylate suspension with a solid content of 40%, and 1 g of propylene glycol until uniform to obtain a solution B; and
- adding the solution B to the solution A to obtain a mixed solution C, and filtering the mixed solution C with a 400-mesh filter paper, followed by granulation to obtain the granular sound-absorbing material.

The granular sound-absorbing material prepared in this comparative example had an average particle size of 365 μm, and a bulk density of 0.360 g/mL.

Comparative Example 7 (with Different Type of Molecular Sieve without Antistatic Additive of Carbon Nanotube Powder)

In this comparative example, a granular sound-absorbing material was provided, which was prepared following the same preparation steps as in comparative example 6, except that 100 g of ZSM-35 molecular sieve particles were used.

The granular antistatic sound-absorbing material prepared in this comparative example had an average particle size of 370 μm, and a bulk density of 0.366 g/mL.

Comparative Example 8 (Blocky Sound-Absorbing Material without Antistatic Additive of Carbon Nanotube Powder)

In this comparative example, a blocky sound-absorbing material was provided, which was prepared following specific steps:

- mixing 100 g of ZSM-5 molecular sieve particles and 90 g of water until uniform, and feeding the resulting mixture to a sand mill, grinding same for 30 min, and then removing same out to obtain a solution A, wherein
- the ZSM-5 molecular sieve particles used had a molar ratio of silicon oxide to aluminum oxide of 425, a pore volume of 0.247 mL/g, an average particle size of 1.73 μm, and a specific surface area of 385 $m^2/g$;
- mixing 30 g of water, 12 g of a polystyrene acrylate suspension with a solid content of 30%, and 1 g of propylene glycol until uniform to obtain a solution B; and
- adding the solution B to the solution A to obtain a mixed solution C, filtering the mixed solution C with a 400-mesh filter paper, then filling same into a block mold (a conventional apparatus used in the art), and molding same by sintering at 450° C. for 4 h, followed by demolding to obtain the blocky sound-absorbing material.

The blocky sound-absorbing material prepared in this comparative example had a bulk density of 0.392 g/mL.

Comparative Example 9 (Flaky Sound-Absorbing Material without Antistatic Additive of Carbon Nanotube Powder)

In this comparative example, a flaky sound-absorbing material was provided, which was prepared following specific steps:

- mixing 100 g of ZSM-5 molecular sieve particles and 90 g of water until uniform, and feeding the resulting mixture to a sand mill, grinding same for 40 min, and then removing same out to obtain a solution A, wherein
- the ZSM-5 molecular sieve particles used had a molar ratio of silicon oxide to aluminum oxide of 425, a pore volume of 0.247 mL/g, an average particle size of 1.73 μm, and a specific surface area of 385 $m^2/g$;
- mixing 30 g of water, 15 g of a polystyrene acrylate suspension with a solid content of 40%, and 1 g of propylene glycol until uniform to obtain a solution B; and
- adding the solution B to the solution A to obtain a mixed solution C, filtering the mixed solution C with a 400-mesh filter paper, then spreading same into a large flat mold (a conventional apparatus used in the art) and drying same at 110° C. for 30 min, followed by demolding to obtain the flaky sound-absorbing material.

The flaky sound-absorbing material prepared in this comparative example had an average thickness of 542 μm, and a bulk density of 0.534 g/mL.

Test Example 1

In this test example, the surface resistance of the granular antistatic sound-absorbing materials prepared in examples 1-4 and 7-12, the granular sound-absorbing materials prepared in comparative examples 1 and 6-7, and the granular antistatic sound-absorbing materials prepared in comparative examples 2-5 was tested respectively; and the acoustic performance (AFO) of loudspeakers with rear cavities respectively filled with the granular antistatic sound-absorbing materials prepared in examples 1-4 and 7-12, the granular sound-absorbing materials prepared in comparative examples 1 and 6-7, and the granular antistatic sound-absorbing materials prepared in comparative examples 2-5 was also tested in this test example.

Here, the tests mentioned above were both performed using conventional methods in the art. For example, the specific test method in terms of the acoustic performance can refer to the method described in "Measurement of electrical impedance" illustrated in paragraphs 0049-0054 in Chinese patent CN 105049997 A. Specifically, the loudspeakers were tested respectively according to the method described in "Measurement of electrical impedance" to obtain electrical impedance spectra, in which the curve was an electrical impedance curve, with the frequency corresponding to the highest point of the electrical impedance curve being $F_0$. With the measured F0 of loudspeakers loaded with no granular antistatic sound-absorbing material or granular sound-absorbing material being denoted as $F_{0\text{-}cavity}$, and the measured F0 of loudspeakers loaded with granular antistatic sound-absorbing materials or granular sound-absorbing materials being denoted as $F_{0\text{-}sample/reference\ sample}$, the AFO was calculated according to the following formula:

$$\Delta F0 = F_{0\text{-}cavity} - F_{0\text{-}sample/reference\ sample}.$$

In this test example, the acoustic performance was tested under conditions: using a standard acoustic test module with a (1) cc rear cavity, with a test filling amount being 0.35 cc.

The surface resistance was tested using a BEST-212 intelligent volume and surface resistivity meter manufactured by Beijing Beiguangjingyi Instrument Equipment Co., Ltd., with the test voltage being 100 V.

The test results of the surface resistance value and the acoustic performance (AFO) obtained in this test example were shown in Table 1, Table 2, Table 3 and Table 4 below.

TABLE 1

Effects of different antistatic additives on surface resistance and acoustic performance of granular antistatic sound-absorbing material

| Sample | Antistatic additive | Amount of antistatic additive (wt %) | Surface resistance value (×$10^6$Ω) | ΔF0 (Hz) |
|---|---|---|---|---|
| Comparative example 1 | None | 0 | 21,000 | 131 |
| Example 1 | Carbon nanotube powder | 0.5 | 5,400 | 130 |
| Example 2 | Carbon nanotube powder | 1 | 1,800 | 128 |
| Example 3 | Carbon nanotube powder | 2 | 36 | 126 |
| Example 4 | Carbon nanotube powder | 3.5 | 7.6 | 120 |
| Comparative example 2 | Carbon nanotube powder | 11 | 4.2 | 93 |
| Comparative example 3 | Carbon nanotube powder | 1 | 86 | 124 |
| Comparative example 4 | Carbon nanotube powder | 1 | 57 | 119 |
| Example 7 | Aqueous carbon nanotube slurry | 1 | 3,640 | 133 |
| Example 8 | Aqueous carbon nanotube slurry | 2 | 920 | 130 |
| Example 9 | Aqueous carbon nanotube slurry | 3 | 24 | 127 |
| Comparative example 5 | Aqueous carbon nanotube slurry | 4 | 12 | 121 |

As can be seen from Table 1 above, the addition of a carbon nanotube powder and an aqueous carbon nanotube slurry significantly reduces the surface resistance of the prepared sound-absorbing granules. Under the premise of the same solid addition amount, the surface resistance value of the granular sound-absorbing material prepared by using a carbon nanotube powder as an antistatic additive is more significantly reduced compared to the granular sound-absorbing material prepared by using an aqueous carbon nanotube slurry as an antistatic additive. This is because the carbon nanotube powder is uniformly mixed with the molecular sieve particles in the same slurry by means of grinding, such that the carbon nanotubes can better attach to the surface of the molecular sieve particles to form a stable system, and the suspension prepared by mixing the resulting mixed solution with an adhesive and an auxiliary agent is less prone to agglomerate and precipitate and has better dispersibility. Moreover, the loss of carbon nanotubes in this stable system during subsequent filtration and standing is also significantly reduced compared to the direct use of a carbon nanotube slurry. Compared to using a carbon nanotube powder as an antistatic additive, when a carbon nanotube slurry is used as an antistatic additive to prepare an antistatic sound-absorbing material, the carbon nanotube slurry is dispersed in a suspension of molecular sieve particles, which dispersion system has a higher viscosity and poor binding between the carbon nanotubes and the molecular sieve particles, is prone to agglomerate and precipitate, and has poor stability and greater loss of carbon nanotubes during subsequent filtration and standing. However, a large amount of carbon nanotube powder attaches to the surface of the molecular sieve particles during grinding, which will affect the pore channels of the molded sound-absorbing granules to some extent. Under the premise of the same solid addition amount, the granular sound-absorbing material prepared by using an aqueous carbon nanotube slurry as an antistatic additive has a better acoustic performance (AFO) compared to the granular sound-absorbing material prepared by using a carbon nanotube powder as an antistatic additive.

As can also be seen from Table 1 above, for comparative example 1, example 1, example 2, example 3, and comparative example 2, the surface resistance of the granular sound-absorbing materials decreases accordingly with the increase of the addition amount of a carbon nanotube powder, which indicates that the antistatic performance of the granular sound-absorbing materials is significantly improved. However, the increase of the addition amount of a carbon nanotube powder also affects the acoustic performance (AFO) of the prepared granular sound-absorbing materials to some certain extent. When the addition amount of a carbon nanotube powder reaches 3.5%, the acoustic performance (AFO) is severely impaired, exceeding 10 Hz; and when the addition amount of a carbon nanotube powder reaches 11%, the acoustic performance (AFO) is further impaired, approaching 40 Hz.

As can also be seen from Table 1 above, for example 2, comparative example 3, and comparative example 4, the surface resistance values of the prepared granular sound-absorbing materials decreases accordingly as the average particle size of the carbon nanotube powder increases, which indicates that the longer the carbon nanotubes as an anti-static additive, the more conducive the conductance of static electricity. However, the larger the average particle size of the carbon nanotubes as an antistatic additive, the greater the impact on the pore channels on the surface of the prepared granular sound-absorbing material, which in turn impairs the acoustic performance (AFO) of the granular sound-absorbing material.

As can also be seen from Table 1 above, for comparative example 1, example 7, example 8, example 9, and comparative example 5, as the addition amount of a carbon nanotube slurry (in terms of solid component) increases, the surface resistance value of the prepared granular sound-absorbing material decreases accordingly. However, with the increase of the addition amount of a carbon nanotube slurry, the acoustic performance (AFO) of the prepared granular sound-absorbing material is reduced, and when the addition amount of a carbon nanotube slurry (based on solid component) reaches 4%, the acoustic performance (AFO) is significantly impaired.

TABLE 2

Effects of antistatic additive on surface resistance and acoustic performance of granular sound-absorbing materials having different types of molecular sieves

| Sample | Type of molecular sieve | Antistatic additive | Amount of antistatic additive (wt %) | Surface resistance value ($\times 10^6 \Omega$) | ΔF0 (Hz) |
|---|---|---|---|---|---|
| Comparative example 1 | ZSM-5 | None | 0 | 21,000 | 131 |
| Example 1 | ZSM-5 | Carbon nanotube powder | 0.5 | 5,400 | 130 |
| Comparative example 6 | S-1 | None | 0 | 20,980 | 125 |
| Example 10 | S-1 | Carbon nanotube powder | 0.5 | 5,231 | 124 |
| Comparative example 7 | ZSM-35 | None | 0 | 21,150 | 132 |
| Example 11 | ZSM-35 | Carbon nanotube powder | 0.5 | 5,196 | 133 |

As can be seen from Table 2 above, for all granular sound-absorbing materials prepared from different types of molecular sieve particles, using a carbon nanotube powder as an antistatic additive can significantly reduce the surface resistance of the granular sound-absorbing material, and the antistatic additive has less effect on the acoustic performance (AFO) of the granular sound-absorbing materials.

TABLE 3

Effects of different types of antistatic additives on surface resistance and acoustic performance of granular antistatic sound-absorbing material

| Sample | Antistatic additive | Amount of antistatic additive (wt %) | Surface resistance value ($\times 10^6 \Omega$) | ΔF0 (Hz) |
|---|---|---|---|---|
| Comparative example 1 | None | 0 | 21,000 | 131 |
| Example 1 | Carbon nanotube powder | 0.5 | 5,400 | 130 |
| Example 12 | Graphene | 0.5 | 6,890 | 112 |

As can be seen from Table 3 above, both carbon nanotube powder and graphene used as antistatic additives can significantly reduce the surface resistance of the prepared granular sound-absorbing materials. However, under the premise that other preparation conditions are basically the same, the granular antistatic sound-absorbing materials prepared by using a carbon nanotube powder as an antistatic additive have a lower surface resistance value compared to those prepared by using graphene as an antistatic additive. Moreover, the granular antistatic sound-absorbing materials prepared by using a carbon nanotube powder as an antistatic additive have better acoustic performance (AFO) compared to those prepared by using graphene as an antistatic additive.

TABLE 4

Effects of antistatic additive on surface resistance and acoustic performance of antistatic sound-absorbing materials in different shapes

| Sample | Material shape | Antistatic additive | Amount of antistatic additive (wt %) | Surface resistance value ($\times 10^6 \Omega$) | ΔF0 (Hz) |
|---|---|---|---|---|---|
| Comparative example 1 | Granular | None | 0 | 21,000 | 131 |
| Example 1 | Granular | Carbon nanotube powder | 0.5 | 5,400 | 130 |
| Comparative example 8 | Blocky | None | 0 | 18,000 | 121 |
| Example 5 | Blocky | Carbon nanotube powder | 0.5 | 6,200 | 119 |
| Comparative example 9 | Flaky | None | 0 | 19,700 | 123 |
| Example 6 | Flaky | Carbon nanotube powder | 0.5 | 6,600 | 122 |

As can be seen from Table 4 above, all antistatic sound-absorbing materials prepared by using a carbon nanotube powder as an antistatic additive have a significantly reduced surface resistance regardless of whether they are granular, blocky or flaky in shape. Moreover, adding a carbon nanotube powder as an antistatic additive has less effect on the acoustic performance (AFO) of the antistatic sound-absorbing material regardless of the shape of the materials.

Test Example 2

In this test example, the yields of the granular antistatic sound-absorbing materials prepared in examples 1-4 and 7-12, the granular sound-absorbing materials prepared in comparative examples 1 and 6-7, and the granular antistatic sound-absorbing materials prepared in comparative examples 2-5 were determined by an existing conventional method in the art, and the experimental results obtained were shown in Table 5 below. The specific process of determining the yield of a material includes: after molding particles into granules, it was necessary to subject the granules to sieving (controlling the particle size) and selection (screening out broken powder) to screen acceptable products, with oversized or undersized granules that are usually irregular in shape being screened out. In the selection stage, the granules with cracked surface were treated as unacceptable cracked powder, while the rest were treated as acceptable products.

TABLE 5

Effects of antistatic additives on product yield of granular antistatic sound-absorbing materials/granular sound-absorbing materials

| Sample | Type of molecular sieve | Antistatic additive | Amount of antistatic additive (wt %) | Acceptable product (wt %) | Unacceptable product: Irregular granules (wt %) | Unacceptable product: Cracked powder (wt %) |
|---|---|---|---|---|---|---|
| Comparative example 1 | ZSM-5 | None | 0 | 95 | 3.6 | 1.4 |
| Example 1 | ZSM-5 | Carbon nanotube powder | 0.5 | 94.8 | 3.9 | 1.3 |
| Example 2 | ZSM-5 | Carbon nanotube powder | 1 | 93.6 | 4.2 | 2.2 |
| Example 3 | ZSM-5 | Carbon nanotube powder | 2 | 91.1 | 6.5 | 2.4 |
| Example 4 | ZSM-5 | Carbon nanotube powder | 3.5 | 89.7 | 8.2 | 2.1 |
| Comparative example 2 | ZSM-5 | Carbon nanotube powder | 11 | 74.3 | 18.8 | 6.9 |
| Comparative example 3 | ZSM-5 | Carbon nanotube powder | 1 | 90.5 | 5.3 | 4.2 |
| Comparative example 4 | ZSM-5 | Carbon nanotube powder | 1 | 87.5 | 7.4 | 5.1 |
| Example 7 | ZSM-5 | Aqueous carbon nanotube slurry | 1 | 93.2 | 5.1 | 1.7 |
| Example 8 | ZSM-5 | Aqueous carbon nanotube slurry | 2 | 89.9 | 8.2 | 1.9 |
| Example 9 | ZSM-5 | Aqueous carbon nanotube slurry | 3 | 89.2 | 8.7 | 2.1 |
| Comparative example 5 | ZSM-5 | Aqueous carbon nanotube slurry | 4 | 82.9 | 13.1 | 4 |
| Comparative example 6 | S-1 | None | 0 | 92.1 | 6.1 | 1.8 |
| Example 10 | S-1 | Carbon nanotube powder | 0.5 | 90.3 | 5.4 | 4.3 |
| Comparative example 7 | ZSM-35 | None | 0 | 91.1 | 7.8 | 1.1 |
| Example 11 | ZSM-35 | Carbon nanotube powder | 0.5 | 91.3 | 4.8 | 3.9 |
| Example 12 | ZSM-5 | Graphene | 0.5 | 89.7 | 5.3 | 5.0 |

As can be seen from Table 5 above, the yield of the products decreases with the increase in the addition amount of a carbon nanotube powder, which is mainly because the carbon nanotube powder leads to more irregular granules and cracked powder. Moreover, as the average particle size of the carbon nanotube powder increases, the proportion of the irregular granules in the obtained products increases significantly. This is because the larger the length of carbon nanotube powder, the more uneven the distribution thereof inside the granules, and the poorer the sphericity of the formed granules.

As can also be seen from Table 5 above, under the premise of the same solid addition amount, the granular sound-absorbing materials prepared by using an aqueous carbon nanotube slurry as an antistatic additive have a lower product yield compared to those prepared by using a carbon nanotube powder as an antistatic additive. This is because the viscosity of the aqueous carbon nanotube slurry is high, and adding more aqueous carbon nanotube slurry leads to a higher viscosity of the mixed system, resulting in more difficulty to disperse for granulation, thereby leading to more irregular granules and cracked powder.

Test Example 3

In this test example, the filling amount of the granular antistatic sound-absorbing materials prepared in examples 1-4 and the granular sound-absorbing material prepared in comparative example 1, respectively filled in the rear cavities of loudspeakers, were tested, and the test results were shown in Table 6 below.

The test in this test example was performed under conditions that the volume of the cavity (the rear cavity) of the loudspeaker modules to be filled was 0.2 cc, and the filling was performed for 10 s with the aid of a funnel.

TABLE 6

Effects of amount of antistatic additive on filling amount of prepared sound-absorbing granules

| Sample | Antistatic additive | Amount of antistatic additive (wt %) | Filling amount (mg) |
|---|---|---|---|
| Comparative example 1 | None | 0 | 62.6 |
| Example 1 | Carbon nanotube powder | 0.5 | 64 |
| Example 2 | Carbon nanotube powder | 1 | 64.7 |
| Example 3 | Carbon nanotube powder | 2 | 65.3 |
| Example 4 | Carbon nanotube powder | 3.5 | 68.3 |

As can be seen from Table 6 above, as the addition amount of the antistatic additive increases, the filling amount of the sound-absorbing granules increases accordingly under specified conditions. However, as the static electricities on the surface of the sound-absorbing granules are reduced, the improvement effect against static electricity does not show a linear trend with the increase of filling amount.

Test Example 4

Figure 2A:
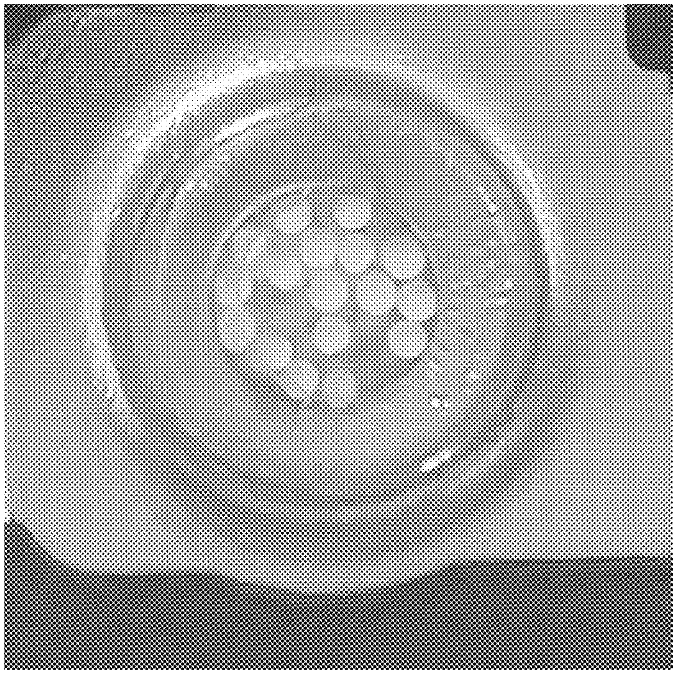
FIG. 2*a* is a picture showing the attachment of the granular sound-absorbing material prepared in comparative example 1 to the pet film at the powder-filling inlet of a box.
Figure 2B:
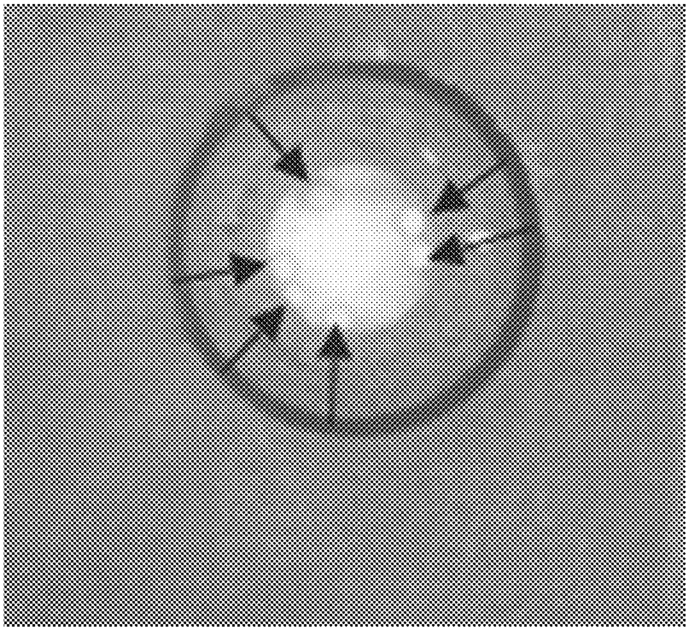
FIG. 2*b* is a picture showing the attachment of the granular antistatic sound-absorbing material prepared in example 1 of the present invention to the pet film at the powder-filling inlet of a box.

In this test example, the attachment of the granular sound-absorbing material prepared in comparative example 1 and the granular antistatic sound-absorbing material prepared in example 1 of the present invention to the pet film at the powder filling inlet of a box were investigated respectively, with the picture showing the attachment of the granular sound-absorbing material prepared in comparative example 1 to the pet film at the powder filling inlet of a box as shown in FIG. 2*a*, and the picture showing the attachment of the granular antistatic sound-absorbing material prepared in example 1 to the pet film at the powder filling inlet of a box as shown in FIG. 2*b*.

From FIGS. 2*a* and 2*b*, it can be seen that the attachment of the granular antistatic sound-absorbing material prepared with the addition of an antistatic additive in example 1 of the present invention to the pet film at the powder filling inlet of a box is significantly reduced compared to the granular sound-absorbing material prepared in comparative example 1, which indicates that the static electricity of the granular antistatic sound-absorbing material has been effectively released.

The above are only specific examples of the present invention and cannot be regarded as limiting the scope of the implementation of the invention; therefore, the replacement of components with equivalent ones, or equivalent changes and modifications made according to the scopes of protection of the present invention should still fall within the scope of the present patent. Additionally, any combination between technical features, a technical feature and a technical invention, and technical inventions in the present invention can be freely made for use.

The invention claimed is:

1. An antistatic sound-absorbing material, comprising molecular sieve particles, an adhesive and an antistatic additive, wherein the antistatic additive is 0.5-10%, based on 100% of the total weight of the molecular sieve particles;

wherein the antistatic additive is carbon nanotubes having an average aperture of 5-20 nm, and an average length of 1-20 μm in $D_{50}$.

2. The antistatic sound-absorbing material according to claim 1, wherein the content of the adhesive, in terms of the solid component of the adhesive, is 4-15%, based on 100% of the total weight of the molecular sieve particles.

3. The antistatic sound-absorbing material according to claim 1, wherein the molecular sieve particles comprise one or more of MFI, MEL, FER, CHA, IHW, IWV, ITE, UTL, VET, and MTW molecular sieves.

4. The antistatic sound-absorbing material according to claim 1, wherein the shape of the antistatic sound-absorbing material includes a granular, blocky or flaky shape.

5. The antistatic sound-absorbing material according to claim 4, wherein the antistatic sound-absorbing material in a granular shape has a three-level pore structure, with the size of a first-level pore structure being 0.3-0.7 nm, the size of a second-level pore structure being 2-30 nm, and the size of a third-level pore structure being 1-10 μm.

6. A method for preparing an antistatic sound-absorbing material, comprising mixing raw materials with a solvent, followed by molding to prepare the antistatic sound-absorbing material; wherein the raw materials comprise molecular sieve particles, an adhesive and an antistatic additive; and the amount of the antistatic additive is 0.5-10%, based on 100% of the total weight of the molecular sieve particles;

wherein the antistatic additive is carbon nanotubes having an average aperture of 5-20 nm, and an average length of 1-20 μm in $D_{50}$.

7. The method for preparing an antistatic sound-absorbing material according to claim 6, wherein the antistatic additive is in the form of a powder or a slurry.

8. The method for preparing an antistatic sound-absorbing material according to claim 7, wherein when the antistatic additive is in the form of a powder, the amount thereof is 0.5-10%; and when the antistatic additive is in the form of a slurry, the amount thereof is 1-10%, in terms of the amount of the solid component of the slurry.

9. The method for preparing an antistatic sound-absorbing material according to claim 7, wherein when the antistatic additive is in the form of a slurry, the solid content thereof is 3-10%.

10. The method for preparing an antistatic sound-absorbing material according to claim 7, wherein when the antistatic additive is in the form of a slurry, the raw materials further comprise a dispersant, and the amount of the dispersant is 0.5-2%, based on 100% of the total weight of the molecular sieve particles.

11. The method for preparing an antistatic sound-absorbing material according to claim 6, wherein the antistatic additive is a carbon nanotube powder or an aqueous carbon nanotube slurry.

12. The method for preparing an antistatic sound-absorbing material according to claim 11, wherein the aqueous carbon nanotube slurry has a pH value of 6-10, and a viscosity of 1,000-5,000 mPa·s.

13. The method for preparing an antistatic sound-absorbing material according to claim 6, wherein the raw materials further comprise an auxiliary agent, and the amount of the auxiliary agent is 0.5-1.5%, based on 100% of the total weight of the molecular sieve particles.

14. A loudspeaker comprising one or more acoustic sensors and one or more housings, which are combined to form a rear cavity of the loudspeaker, wherein the rear cavity of the loudspeaker is filled with an antistatic sound-absorbing material according to claim 1.

15. An electronic device, comprising a loudspeaker filled with an antistatic sound-absorbing material according to claim 1 in the rear cavity thereof.

16. The electronic device according to claim 15, wherein the electronic device includes a smartphone, a TWS headphone, a headset, smart glasses, a smart watch, a VR device, an AR device, a tablet computer, or a thin-and-light notebook computer.

17. The antistatic sound-absorbing material according to claim 1, wherein the molecular sieve particles have a specific surface area greater than 300 $m^2/g$, a pore volume of 0.16-0.32 $cm^3/g$, a molar ratio of silicon oxide to aluminum oxide greater than 200, and an average particle size of 0.1-30 μm.

18. The antistatic sound-absorbing material according to claim 1, wherein the antistatic additive is carbon nanotubes having an average aperture of 5-20 nm, and an average length of 5-15 μm in $D_{50}$.

19. The antistatic sound-absorbing material according to claim 1, wherein the adhesive comprises an organic adhesive and/or an inorganic adhesive.

20. The antistatic sound-absorbing material according to claim 19, wherein the organic adhesive comprises one or more of a polyacrylate suspension, a polystyrene acrylate suspension, a polyvinyl acetate suspension, and a polystyrene butadiene suspension; and the inorganic adhesive comprises one or more of kaolin, a silica sol, an alumina sol and carboxymethyl cellulose.

* * * * *